Oct. 30, 1945.  E. M. SPLAINE  2,388,191
OPHTHALMIC MOUNTING AND METHOD OF MAKING AND ADJUSTING THE SAME
Filed Nov. 1, 1943  3 Sheets-Sheet 1
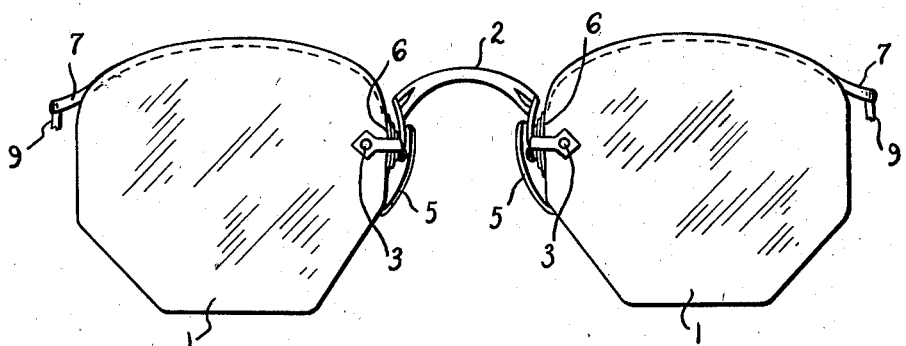
Fig. I
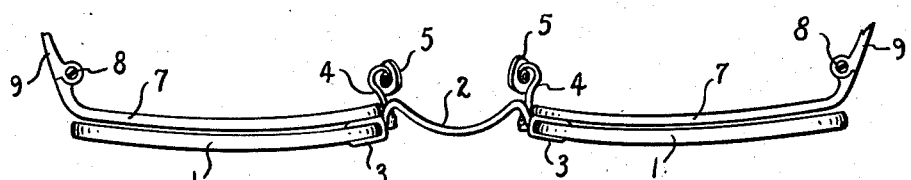
Fig. II
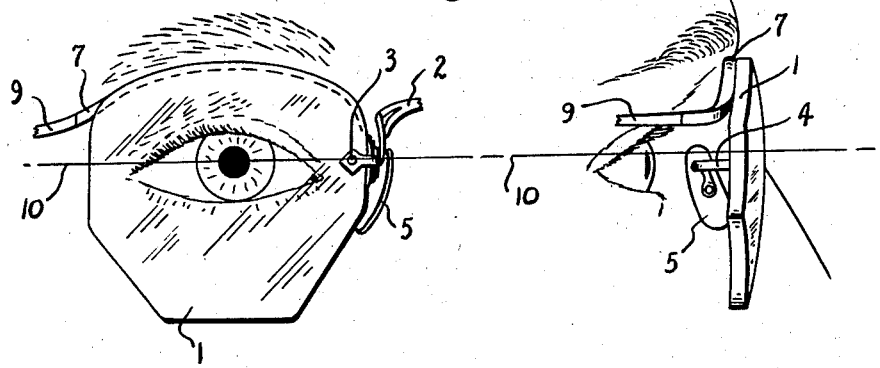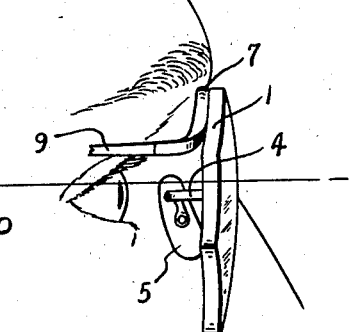
Fig. III  Fig. IV
INVENTOR.
EDWARD M. SPLAINE
BY
*Louis A. Gagnon*
ATTY.

Oct. 30, 1945.   E. M. SPLAINE   2,388,191
OPHTHALMIC MOUNTING AND METHOD OF MAKING AND ADJUSTING THE SAME
Filed Nov. 1, 1943   3 Sheets-Sheet 2
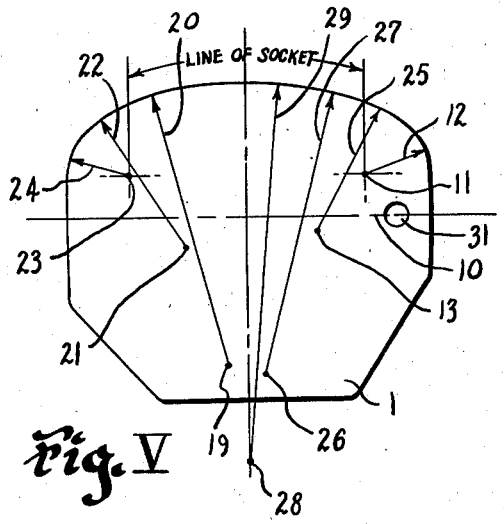
Fig. V
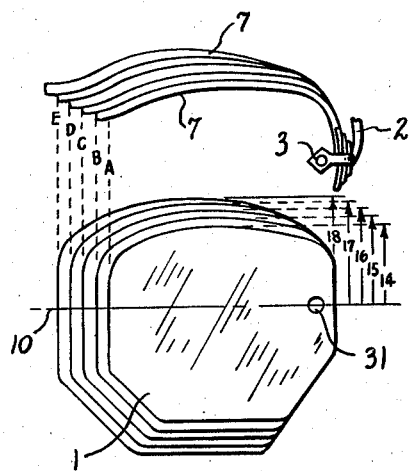
Fig. VI
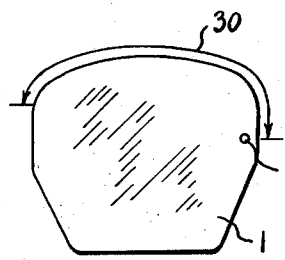
Fig. VII
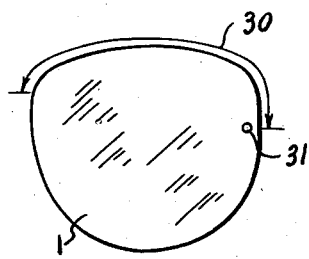
Fig. VIII
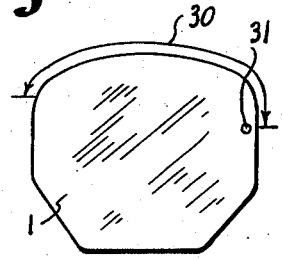
Fig. IX
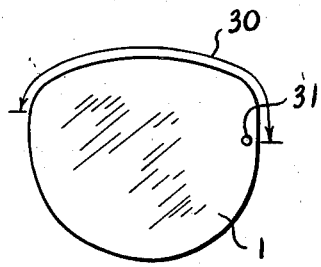
Fig. X
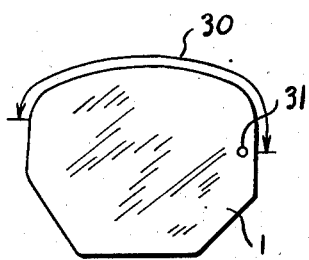
Fig. XI
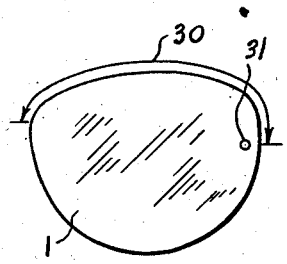
Fig. XII
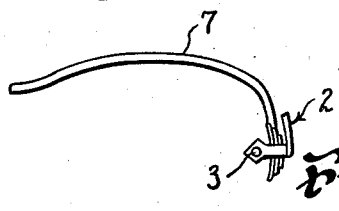
Fig. XIII
INVENTOR.
EDWARD M. SPLAINE
BY
Louis L. Gagnon
ATTY.

Oct. 30, 1945.  E. M. SPLAINE  2,388,191
OPHTHALMIC MOUNTING AND METHOD OF MAKING AND ADJUSTING THE SAME
Filed Nov. 1, 1943  3 Sheets-Sheet 3
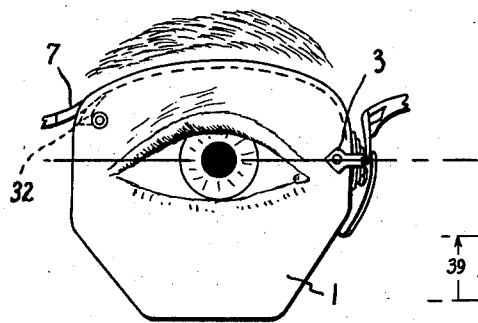
Fig. XIV
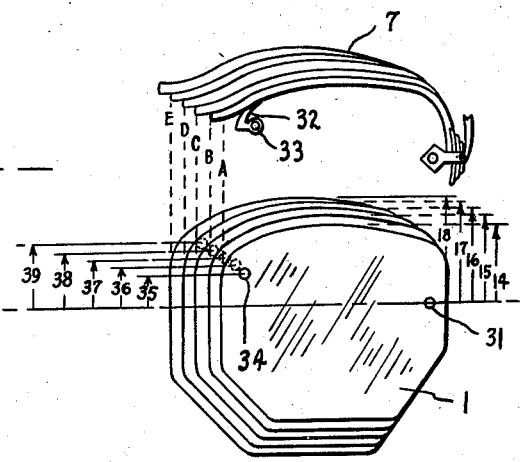
Fig. XV
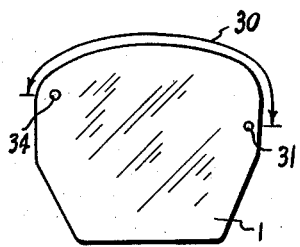
Fig. XVI
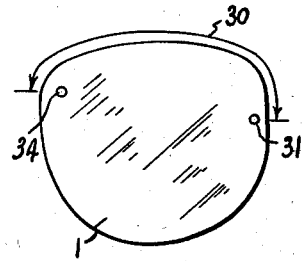
Fig. XVII
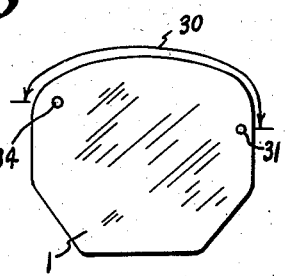
Fig. XVIII
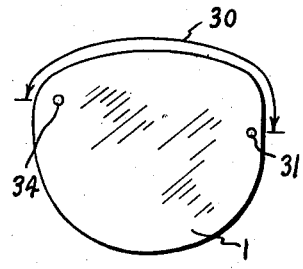
Fig. XIX
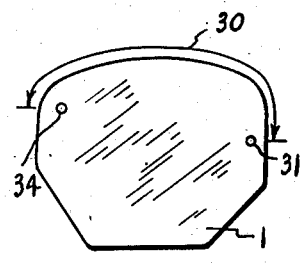
Fig. XX
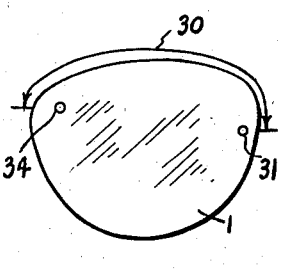
Fig. XXI
INVENTOR.
EDWARD M. SPLAINE
BY
ATTY.

Patented Oct. 30, 1945

2,388,191

UNITED STATES PATENT OFFICE 2,388,191

OPHTHALMIC MOUNTING AND METHOD OF MAKING AND ADJUSTING THE SAME

Edward M. Splaine, Southbridge, Mass., assignor to American Optical Company, Southbridge, Mass., a voluntary association of Massachusetts Application November 1, 1943, Serial No. 508,544

10 Claims. (Cl. 88—41)

This invention relates to improvements in spectacles and has particular reference to improved means for aligning and adjusting the spectacles with the top lines of the eye sockets and to improved processes for carrying out the same.

This is a continuation in part of my copending application Serial No. 357,625 filed September 20, 1940.

A principal object of the invention is to provide improved means in spectacles whereby the variable facial requirements of different patients may be provided for.

Another object of the invention is to provide improved parts of spectacles whereby the parts may be more expeditiously assembled and fitted than is now possible.

Another object of the invention is to provide improved processes of assembling and fitting parts of spectacles so they may be made to fit the facial requirements of different people in a simple, expeditious and economical manner.

Another object of the invention is to provide improved frame and lens parts for spectacles which may be assembled with facility and economically to provide finished spectacles for people with varying facial requirements.

Another object of the invention is to provide improved arrangements of spectacle parts that will reduce the cost of production of said spectacles in assembling, adjusting and fitting them to people with different facial characteristics.

Another object of the invention is to provide standardized lens and frame parts in series to cover the range of facial requirements of different people.

Another object of the invention is to provide new and improved processes for assembling, adjusting and fitting spectacles to prescription to make them applicable to persons of different facial characteristics.

Another object of the invention is to cheapen the cost of assembling, adjusting and fitting spectacles to prescription, and cut down the stock of spectacle parts that have to be carried.

Other objects and advantages of the invention will become apparent from the following description taken in conjunction with the accompanying drawings. It will be apparent that changes may be made in the details of construction and arrangement of parts and in the steps of the processes without departing from the invention as set forth in the accompanying claims. It is therefore not desired to limit the invention to the exact matters shown and described as the preferred matters have been shown by way of illustration only.

Referring to the drawings:

Fig. I is a front view of a pair of spectacles embodying the invention;

Fig. II is a top view of Fig. I;

Fig. III is a partial diagrammatic view showing the relation of the eye and eye socket to the lens of a spectacle;

Fig. IV is a side view of Fig. III;

Fig. V is a front view of a spectacle lens, enlarged and showing the method of laying out its shape;

Fig. VI is a partial diagrammatic view showing a series of lenses and a series of frame arms for spectacles for people of different facial characteristics;

Figs. VII, VIII, IX, X, XI, and XII are front views of lenses for spectacles and having different shapes on their lower sides;

Fig. XIII is a front view of a partial spectacle frame showing a temple support and lens connection;

Fig. XIV is a view generally similar to Fig. III showing a modification of the invention;

Fig. XV is a view similar to Fig. VI showing a modification of the invention; and Figs. XVI, XVII, XVIII, XIX, XX, and XXI are views similar to Figs. VII, VIII, IX, X, XI, and XII showing modifications of the invention.

Spectacle frames known as the semi-rimless frame having a temple supporting arm or arc following the top of the lenses and to the rear thereof and secured to the lenses only on the nasal sides thereof have become extremely popular in the last two years. In these spectacles the frame arcs are practically invisible. These spectacles, however, do not look well unless the tops of their lenses are shaped to substantially follow the top line of the eye socket. It is therefore a principal object of this invention to provide means by which this may be done in an economical way for persons having different facial characteristics and so that these spectacles may be assembled, adjusted and fitted with the least cost to the dispensing optician, and the stock of parts that have to be carried by the optician cut down to a minimum to save large investments.

Referring to the drawings in which corresponding parts are indicated by corresponding reference characters throughout:

The lenses 1 have the usual finished optical surfaces on their two faces. They are held in spaced alignment by a bridge member 2 to which are secured the lens straps 3, which are secured to the lenses by screws, solder or other means usual in the art. Guard arms are attached to or supported by the straps 3 and support the guards 5 for bearing on the sides of the nose. Edge springs 6 are inserted in place between the bosom of the straps 3 and the edges of the lenses 1 where desired to produce a resilient connection for the lenses.

The temple supporting arms or arcs 7 are supported adjacent the strap, guard arm and bridge connections on the nasal sides, and follow the contour of the top edges of the lenses 1 and terminate in temple connections at 8 to which the temples 9 are pivoted.

The relationship of the lenses 1 and the arcs 7 to the eye when in place of use and to the brows and eye sockets is shown in Figs. III and IV. The connection 31 for the lens strap 3 is located substantially on a horizontal line 10 passing through the center of the pupil of the eye, and the top line of the lenses 1 and the line of the arcs 7 follow substantially the line of the top of the eye sockets. This positioning of the lenses with respect to the eyes and the eye sockets is of importance in this invention from the standpoints of standardizing the shapes of the lenses, the lengths of the arcs 7, the appearance of the device on the face when in use and for facility in assembling, adjusting and fitting the parts to accommodate varying facial characteristics and reducing the stock of parts necessary for the prescription assembler and fitter to carry. This will be further explained in the description of Figs. V and VI.

The characteristics of the shape of the lenses 1 are shown in Fig. V. It will be noted that the top line of the lenses 1 comprises a series of arcs tangentially blended together to produce a continuous line closely approximating the line of the top of the eye sockets. These arcs are struck about a plurality of centers forming radii of different lengths. The positions of the centers of these radii and the lengths thereof are located and made to insure this continuous top line closely following the line of the top of the eye sockets. Starting from the nasal side of the lenses the arcs are as follows: The first struck about the center 11 with the radius 12, then the second with center at 13 and radius 25, then at center 26, radius 27, then at center 28 and radius 29, then at center 19 and radius 20, then at center 21 and radius 22, and then at center 23 and radius 24. All these arcs are blended smoothly on the top line of the lenses. The lens connection position is located substantially on the horizontal line 10 passing through the center of the eye when the lenses are in place on the face. This is on the nasal side of the lenses as indicated at 31. The nasal sides of all the lenses 1 are of the same shape and contour regardless of size, and the connecting position 31 is the same for all lenses regardless of size. These features will be further pointed out in the description of Fig. VI.

The shapes of the lenses 1, their sizes, and the lengths of the arcs 7 are standardized as shown in Fig. VI. In the lower half of Fig. VI is shown a series of five lenses 1 superimposed one over the other. It will be noted that the lens connecting point 31 is the same for all the lenses of the series, and that the shape or contour of the nasal edges is the same for all the lenses of the series. The heights above the horizontal line 10, indicated by the numerals 14, 15, 16, 17 and 18 are progressively greater from the line 10 upwardly. The lenses are progressively wider toward the temple sides, and the depths below the line 10 are progressively greater. It will be noted that the top, temporal and bottom edges are substantially parallel with each other.

In the top half of Fig. VI is indicated a series of arc arms 7. These arms are progressively larger as indicated by the letters A, B, C, D, and E. The length of each of these arms is made to correspond with the length of the top edge of its corresponding lens.

The standardization of these lens shapes and arc arms in a graded series is very important in this invention as it provides many valuable advantages. It simplifies greatly the assembly of the parts for a desired prescription and reduces to a minimum the stock of parts that have to be carried. It standardizes the position of the lens connecting point, the shape of the nasal edges of the lenses where they have to fit the nose, and it provides a stock of parts that may be readily assembled to fit the facial characteristics of different patients through the usual practical range of such requirements.

The procedure of shaping the lenses 1 is as follows: These lenses are first marked to approximate shape and cut to that shape by a diamond cutter. The edges are then edged and smoothed on a lens edging machine having an edging stone and a cam former which regulates the shape of the lens as it is being edged. This former is approximately of the shape and size of the top lens of the series indicated in Fig. VI. The cam shoe for the former on the edging machine may be set by a screw attachment so that the various heights and widths of the lenses of the series may be obtained by use of the single former. The former shoe adjuster is provided with a scale so that it may be set to obtain any desired unit of the series of lenses.

The spectacle is assembled by shaping the lenses to the shape of the desired unit of the series. The corresponding arc arms 7 are selected and soldered to the bridge, guard arm and lens strap unit known in the art as the center. The lenses are secured at the points 31 by the lens straps and the temples are pivotally connected to the arc arms 7. The spectacle is adjusted and fitted to the face by bending the parts of the center, the arcs 7 and the temples 9 with optician's pliers.

While the nasal sides and top edges of the lenses are standardized as to shape or contour, the temple sides and lower edges of the lenses may be varied to suit individual tastes, as indicated in Figs. VII to XII inclusive. Of course, where these two sides are varied a former having the desired contour will have to be used on the edging machine. It will be noted in Figs. VII to XII inclusive that the top edges indicated by the line and arrow heads and marked 30 are of the same contour shape to follow the line of the top of the eye socket. The nasal edges of the lenses above the lens connecting point 31 are also alike, and the connecting point 31 is the same for all lenses.

This shaping of the lenses 1 and the standardization of the top edges, the lens connecting point 31 and the lengths of the arcs 7 greatly facilitate the assembly of these spectacles, enhance their appearance and provide a maximum of economy and saving in labor to the prescription dispenser of these articels to the wearer and is an important advance in this art.

Spectacles having arc arms 7 are most desirable from the standpoint of appearance, as they give the appearance of rimless spectacles. They give this appearance while providing the desirable supporting features of the rimmed type of spectacles, and reduce greatly the tendency to breakage at the strap connections so prevalent in the older forms of spectacles. While most desirable this form of spectacle is most difficult to assemble and to adjust to the patients' requirements. While the opticians of higher skill and better equipment are qualified to assemble and adjust these spectacles, opticians not having adequate equipment found it most difficult if not almost impossible to adjust these spectacles to their patients' requirement. With the present invention and the standardization established by it adjusting is greatly reduced. In fact there is scarcely any adjustment required as to the arc and lens top features and this spectacle can now be assembled and adjusted with equal facility on the old forms with which the optician is familiar and equipped to handle. The unusual adjustments have been standardized leaving practically only adjustments to be made that the optician is experienced and equipped to make.

The novel features of the top edge shape of the lenses and the location of the strap connection substantially on a horizontal line in front of the center of the eyes are of primary importance in obtaining the great advantages of this invention.

Making the arc arms 7 in a series of graded lengths allows them to be preshaped. The shaping of the top edges of the lenses to a former pattern on a lens edging machine insures that the top edges will be finished to the preshaped lines of the arc arms 7. The standardization of the lens connecting point 31 provides an automatic aligning device insuring that the preshaped arcs and top edges of the lenses will take their required positions on assembly.

The frame parts of the mounting are of bendable metal and comprise the bridge 2, the guard arms 4, the guards 5, the lens straps 3, the arc arms 7 and the temples 9. The parts are adjusted to the facial requirements of the wearer by bending with pliers the bridge, the guard arm, the arc arms and the temples.

In this invention the arc arms 7 being preshaped and the top edges of the lenses being predetermined in the former construction, very little if any adjustment of the arcs 7 is required. It is very difficult to bend these arcs 7 without marring them and is an operation only the most expert can accomplish successfully, hence the preshaping of these parts is important.

Fig. XIV shows a modification of the invention wherein the temple supporting arms 7 are provided with lens connecting lugs 32 at their temporal ends to provide further support for the lenses.

The lens connecting lugs 32 extend downwardly and inwardly from the temple supporting arms 7, and terminate in enlarged perforated ends 33 which are adapted to align with suitable apertures 34 in the lenses 1 and to be connected therewith by screws, solder connections or other suitable means usual in the art.

Fig. XV shows a standardized series of lenses and temple supporting arms used in the construction shown in Fig. XIV.

The upper part of Fig. XV indicates a series of lens supporting arms 7, similar to those shown in Fig. VI, but with the lens connecting lugs 32 shown in their proper position at the temporal ends thereof. These arms are progressively larger as indicated by the letters A, B, C, D, and E. The length of each of these arms is made to correspond with the length of the top edge of its corresponding lens, and the perforated ends 33 of the lugs 32 will align with the apertures 34 in the corresponding lenses.

In the lower half of Fig. XV is shown a series of lenses superimposed one over the other. It will be noted that the lens connection openings 31 at the nasal sides of the lenses are in the same position for all the lenses in the series, and that the shape or contour of the nasal sides is the same. The heights above the horizontal line 10, indicated by the numerals 14, 15, 16, 17 and 18 are progressively greater, thus making the lenses wider toward the temporal sides. With the lenses wider at their temporal sides it means that the apertures 34 will have to be varied as to their distances above the center line of the lenses according to the different sizes of lenses. This is shown by the numerals 35, 36, 37, 38 and 39 indicating the different heights of the apertures above the center line and the drill position for said apertures for the several lens sizes.

Figs. XVI, XVII, XVIII, XIX, XX, and XXI show a plurality of lenses with the nasal and top edges of a standardized shape, as indicated by the line and arrows 30, while the temporal and bottom edges are varied to suit individual tastes.

The apertures 31 are positioned in the lenses at the same position on all lenses as has been previously stated. The apertures 34 are positioned in the lenses in a standardized manner according to the particular size of lens required, as shown in Fig. XV. It will readily be seen that with this method the temple supporting arms will be automatically positioned in their proper location along the upper contour edges of the lenses when the lens strap 3 and the lug 32 are in connected relation with the lenses, thereby obviating further major adjustments.

From the foregoing it will be seen that I have devised simple, efficient and economical means for obtaining all the objects and advantages of the invention and particularly in providing means improving the dispensing of these articles to the wearer in a way that will insure his receiving the full benefits of this type of spectacle especially in the correct fitting of the same.

Having described my invention, I claim:

1. An ophthalmic mounting comprising a pair of lenses and a lens supporting structure for said lenses, said lens supporting structure comprising a bridge member, lens holding means adjacent the opposed sides of the bridge member, relatively long and slender temple supports secured adjacent the lens holding means and progressing upwardly and outwardly along the upper contour edges of the lenses and terminating in temple connections and temples secured to said temple connections, said lenses each having a connection opening therein to which the lens holding means may be attached, said connection openings being located along a horizontal medial line at a given predetermined location on the lenses for establishing the position of the optical centers of the lenses relative to the line of straight ahead vision through the lenses, the upper contour edges of said lenses being of substantially identical size and shape and being located above the horizontal medial line at a given controlled height with said shape being such as to follow substantially the contour of the brow line and with the height thereof above the horizontal medial line so controlled as to cause the upper contour edges of the lenses to lie below the brow line when the lenses are in accurate position before the eyes, the shape of said upper contour edges being that obtained by shaping the edge adjacent the vertical center line to a curve of a radius whose center lies below and out of the area of the lens and with curvatures on the opposed sides of said vertical center line which are of progressively shorter radii of curvature lying within the area of the lens and below the horizontal medial line and terminating in curvatures whose centers lie above the horizontal medial line and blend with the respective side edges of the lenses, said long and slender temple supports being of substantially the same size and shape as the upper contour edge of the respective lenses and being shaped to follow said upper contour edges with the upper surfaces thereof in substantially flush relation and with the long and slender temple supports located in a plane in the rear of the lenses whereby the controlled height of the upper edges of the lenses above the horizontal medial line and the controlled contour shape thereof will cause the long and slender temple supports to lie beneath the brow line with a controlled clearance when the mounting is in position of use, the said temple supporting ends of the temple supports extending rearwardly of the lenses at a given controlled height above the horizontal medial line.

2. In a device of the character described comprising the combination of a pair of lenses each having a connection opening therein located along a horizontal medial line and an upper contour edge located at a given distance above said horizontal medial line, said upper contour edge of the lens being of a shape resulting from the merging of a plurality of curvatures of different radii, the curvature of said upper edge of the lens, adjacent the vertical center line of the lens, being of a radius having its center below and removed from the area of the lens and blending with a curvature having its center lying within the area of and adjacent the bottom of the lens and to one side of the vertical center line and blending with another curvature of a shorter radius lying within the area of the lens with its center located adjacent to and below the horizontal medial line, said latter curvature blending with another curvature of shorter radius whose center lies within the area of the lens and above the horizontal medial line, said curvature of shorter radius blending with a side edge of the lens, the said upper edge of the lens, on the opposed side of said vertical center line, comprising a curvature whose center lies within the area of the lens and adjacent the bottom thereof and blending with the curvature of longer radius on the side thereof towards the vertical center line of the lens and, on the opposed side, with a curvature of a shorter radius whose center lies below the horizontal medial line, said latter curvature blending with a curvature of shorter radius whose center lies above the horizontal medial line and which blends with the edge surface on said side of the lens.

3. In a device of the character described comprising the combination of a pair of lenses each having a connection opening therein located along a horizontal medial line and an upper contour edge located at a given distance above said horizontal medial line, said upper contour edge of the lens being of a shape resulting from the merging of a plurality of curvatures of different radii, the curvature of said upper edge of the lens, adjacent the vertical center line of the lens, being of a radius having its center below and removed from the area of the lens and blending with a curvature having its center lying within the area of and adjacent the bottom of the lens and to one side of the vertical center line and blending with another curvature of a shorter radius lying within the area of the lens with its center located adjacent to and below the horizontal medial line, said latter curvature blending with another curvature of shorter radius whose center lies within the area of the lens and above the horizontal medial line, said curvature of shorter radius blending with a side edge of the lens, the said upper edge of the lens, on the opposed side of said vertical center line, comprising a curvature whose center lies within the area of the lens and adjacent the bottom thereof and blending with the curvature of longer radius on the side thereof towards the vertical center line of the lens and, on the opposed side, with a curvature of a shorter radius whose center lies below the horizontal medial line, said latter curvature blending with a curvature of shorter radius whose center lies above the horizontal medial line and which blends with the edge surface on said side of the lens and a lens supporting structure for said lenses, said lens supporting structure embodying lens holding means adapted to be secured to the connection openings in the lenses, bridge means for supporting said lens holding means in spaced relation with each other and relatively long and slender temple supports of an initial shape substantially identical to that of the upper contour edges of the lenses from a point adjacent the lens connection openings thereof to a given point located above the horizontal medial line on the temporal sides of the lenses with said temple supports having temple pivotal connections adjacent the temporal ends thereof and temples pivotally connected with said ends.

4. The process of assembling and adjusting a spectacle to the facial requirements of an individual comprising forming a pair of lenses with upper edge contours of a given shape and at a given distance above a horizontal medial line by forming said upper edge adjacent the vertical center line of the lens to a curve of a radius whose center lies below and out of the area of the lens and with curvatures on the opposed sides of said vertical center line which are progressively of shorter radii of curvature whose centers lie within the area of the lens and below said horizontal medial line and terminating in curvatures whose centers lie above the horizontal medial line and blend with the respective side edges of the lenses, forming a connection opening on the nasal sides of the lenses on said horizontal medial line, forming a lens supporting structure comprising an adjustable bridge member, lens holding means and long and slender temple supports shaped substantially to the upper contour edges of the respective lenses and terminating in temple connection ends having temples secured thereto with said temple connection ends being located a controlled distance above the horizontal medial line on the temporal sides of the lenses, securing said lens holding means to the connection openings in the lenses, adjusting the bridge member to position the horizontal medial lines at a given location before the line of straight ahead vision of the individual and to simultaneously position the upper contour edges of the lenses below the brow lines of the individual and adjusting the long and slender temple supports while retaining the relation of said temple supports with the upper contour edges of the lenses whereby said long and slender temple supports will follow the upper contour edges of the lenses and the temple supporting ends thereof will be located at a predetermined distance above the horizontal medial lines and to alter the distance between and the angle of the temples relative to the plane of the lenses to meet the facial requirements of the individual whereby the long and slender temple supports will lie below the brow line between the lens and said brow.

5. The process of assembling and adjusting a spectacle to the facial characteristics of an individual comprising forming a pair of lenses each with a connection opening located along a horizontal medial line and with an upper contour edge located at a given distance above said horizontal medial line, controlling the shape of said upper contour edge by forming a curvature of a radius adjacent the vertical center line of the lens having its center below and removed from the area of the lens and blending with curvatures on the opposed sides of the vertical center line having their centers of curvature lying within the area of and adjacent the bottom of the lens and blending with other outer curvatures of shorter radius lying within the area of the lens with their centers located adjacent to but below the horizontal medial line, said latter curvatures blending with other outer curvatures whose centers lie within the area of the lens above said horizontal medial line, said curvatures of shorter radii blending with the respective opposed side edges of the lens, forming a lens supporting structure for said lenses comprising a bridge member, lens holding means, long and slender temple supports initially shaped to the same resultant shape of the upper contour edges of the lenses and terminating in temple connections to which temples are pivotally connected, securing the lens holding means to the lenses and the connection openings therein, adjusting the bridge member to position the horizontal medial line of the lenses at a given position relative to the line of straight ahead vision and adjusting the long and slender temple supports while retaining their fitted relation with the upper contour edge of the lenses and the desired position of said temple supports above the horizontal medial line to alter the distance between the temples and the angle of said temples relative to the plane of the lenses to meet the facial requirements of the individual whereby the controlled distance of the upper contour edges of the lenses above the horizontal medial line will position said upper contour edges below the brow of the individual and simultaneously position the long and slender temple supports below the brow between the upper contour edges of the lenses and said brow.

6. An ophthalmic mounting comprising a pair of lenses and a lens supporting structure for said lenses, said lens supporting structure comprising a bridge member, lens holding means adjacent the opposed sides of the bridge member, relatively long and slender temple supports secured adjacent the lens holding means and progressing upwardly and outwardly along the upper contour edges of the lenses and terminating in temple connections and having depending lens connecting lugs adjacent said temple connections, said lugs having perforated ends located at a given position, temples secured to said temple connections, said lenses each having connection openings therein to which the lens holding means and the lugs may be attached, said connection openings on the nasal sides of the lenses being located along a horizontal medial line at a given predetermined location on the lenses for establishing the position of the optical centers of the lenses relative to the line of straight ahead vision through the lenses, and the connection openings on the temporal sides being at a controlled distance above said medial line, the upper contour edges of said lenses being of substantially identical size and shape and being located above the horizontal medial line at a given controlled height with said shape being such as to follow substantially the contour of the brow line and with the height thereof above the horizontal medial line so controlled as to cause the upper contour edges of the lenses to lie below the brow line when the lenses are in accurate position before the eyes, the shape of said upper contour edges being that obtained by shaping the edge adjacent the vertical center line to a curve of a radius whose center lies below and out of the area of the lens and with curvatures on the opposed sides of said vertical center line which are of progressively shorter radii of curvature lying within the area of the lens and below the horizontal medial line and terminating in curvatures whose centers lie above the horizontal medial line and blend with the respective side edges of the lenses, said long and slender temple supports being of substantially the same size and shape as the upper contour edge of the respective lenses and being shaped to follow said upper contour edges with the upper surfaces thereof in substantially flush relation and with the long and slender temple supports located in a plane in the rear of the lenses whereby the controlled height of the upper edges of the lenses above the horizontal medial line and the controlled contour shape thereof will cause the long and slender temple supports to lie beneath the brow line with a controlled clearance when the mounting is in position of use, the said temple supporting ends of the temple supports extending rearwardly of the lenses at a given controlled height above the horizontal medial line.

7. In a device of the character described comprising the combination of a pair of lenses each having connection openings therein with the openings on the nasal sides being located along a horizontal medial line and the openings on the temporal sides being located at a given position above the medial line, said lenses having an upper contour edge located at a given distance above said horizontal medial line, said upper contour edge of the lens being of a shape resulting from the merging of a plurality of curvatures of different radii, the curvature of said upper edge of the lens, adjacent the vertical center line of the lens, being of a radius having its center below and removed from the area of the lens and blending with a curvature having its center lying within the area of and adjacent the bottom of the lens and to one side of the vertical center line and blending with another curvature of a shorter radius lying within the area of the lens with its center located adjacent to and below the horizontal medial line, said latter curvature blending with another curvature of shorter radius whose center lies within the area of the lens and above the horizontal medial line, said curvature of shorter radius blending with a side edge of the lens, the said upper edge of the lens, on the opposed side of said vertical center line, comprising a curvature whose center lies within the area of the lens and adjacent the bottom thereof and blending with the curvature of longer radius on the side thereof towards the vertical center line of the lens and, on the opposed side, with a curvature of a shorter radius whose center lies below the horizontal medial line, said latter curvature blending with a curvature of shorter radius whose center lies above the horizontal medial line and which blends with the edge surface on said side of the lens.

8. In a device of the character described comprising the combination of a pair of lenses each having connection openings therein with the openings on the nasal sides being located along a horizontal medial line and the openings on the temporal sides being located at a given position above the medial line, said lenses having an upper contour edge located at a given distance above said horizontal medial line, said upper contour edge of the lens being of a shape resulting from the merging of a plurality of curvatures of different radii, the curvature of said upper edge of the lens, adjacent the vertical center line of the lens, being of a radius having its center below and removed from the area of the lens and blending with a curvature having its center lying within the area of and adjacent the bottom of the lens and to one side of the vertical center line and blending with another curvature of a shorter radius lying within the area of the lens with its center located adjacent to and below the horizontal medial line, said latter curvature blending with another curvature of shorter radius whose center lies within the area of the lens and above the horizontal medial line, said curvature of shorter radius blending with a side edge of the lens, the said upper edge of the lens, on the opposed side of said vertical center line, comprising a curvature whose center lies within the area of the lens and adjacent the bottom thereof and blending with the curvature of longer radius on the side thereof towards the vertical center line of the lens and, on the opposed side, with a curvature of a shorter radius whose center lies below the horizontal medial line, said latter curvature blending with a curvature of shorter radius whose center lies above the horizontal medial line and which blends with the edge surface on said side of the lens and a lens supporting structure for said lenses, said lens supporting structure embodying lens holding means adapted to be secured to the connection openings in the lenses, bridge means for supporting said lens holding means in spaced relation with each other and relatively long and slender temple supports of an initial shape substantially identical to that of the upper contour edges of the lenses from a point adjacent the nasal lens connection openings thereof to a given point located above the horizontal medial line on the temporal sides of the lenses with said temple supports having temple pivotal connections adjacent the temporal ends thereof and temples pivotally connected with said ends.

9. The process of assembling and adjusting a spectacle to the facial requirements of an individual comprising forming a pair of lenses with upper edge contours of a given shape and at a given distance above a horizontal medial line by forming said upper edge adjacent the vertical center line of the lens to a curve of a radius whose center lies below and out of the area of the lens and with curvatures on the opposed sides of said vertical center line which are progressively of shorter radii of curvature whose centers lie within the area of the lens and below said horizontal medial line and terminating in curvatures whose centers lie above the horizontal medial line and blend with the respective side edges of the lenses, forming connection openings on the nasal sides of the lenses on said horizontal medial line, forming connection openings on the temporal sides of the lenses at a given distance above said medial line, forming a lens supporting structure comprising an adjustable bridge member, lens holding means and long and slender temple supports shaped substantially to the upper contour edges of the respective lenses and terminating in temple connection ends having temples secured thereto with said temple connection ends being located a controlled distance above the horizontal medial line on the temporal sides of the lenses, securing said lens holding means to the connection openings in the lenses, adjusting the bridge mmeber to position the horizontal medial lines at a given location before the line of straight ahead vision of the individual and to simultaneously position the upper contour edges of the lenses below the brow lines of the individual and adjusting the long and slender temple supports while retaining the relation of said temple supports with the upper contour edges of the lenses whereby said long and slender temple supports will follow the upper contour edges of the lenses and the temple supporting ends thereof will be located at a predetermined distance above the horizontal medial lines and to alter the distance between and the angle of the temples relative to the plane of the lenses to meet the facial requirements of the individual whereby the long and slender temple supports will lie below the brow line between the lens and said brow.

10. The process of assembling and adjusting a spectacle to the facial characteristics of an individual comprising forming a pair of lenses each with a connection opening on the nasal side located along a horizontal medial line, a connection opening on the temporal side located at a given position above the medial line, and with an upper contour edge located at a given distance above said horizontal medial line, controlling the shape of said upper contour edge by forming a curvature of a radius adjacent the vertical center line of the lens having its center below and removed from the area of the lens and blending with curvatures on the opposed sides of the vertical center line having their centers of curvature lying within the area of and adjacent the bottom of the lens and blending with other outer curvatures of shorter radius lying within the area of the lens with their centers located adjacent to but below the horizontal medial line, said latter curvatures blending with other outer curvatures whose centers lie within the area of the lens above said horizontal medial line, said curvatures of shorter radii blending with the respective opposed side edges of the lens, forming a lens supporting structure for said lenses comprising a bridge member, lens holding means, long and slender temple supports initially shaped to the same resulant shape of the upper contour edges of the lenses and terminating in temple connections to which temples are pivotally connected, securing the lens holding means to the lenses and the connection openings therein, adjusting the bridge member to position the horizontal medial line of the lenses at a given position relative to the line of straight ahead vision and adjusting the long and slender temple supports while retaining their fitted relation with the upper contour edge of the lenses and the desired position of said temple supports above the horizontal medial line to alter the distance between the temples and the angle of said temples relative to the plane of the lenses to meet the facial requirements of the individual whereby the controlled distance of the upper contour edges of the lenses above the horizontal medial line will position said upper contour edges below the brow of the individual and simultaneously position the long and slender temple supports below the brow between the upper contour edges of the lenses and said brow.

EDWARD M. SPLAINE.